United States Patent
Kotani et al.

(10) Patent No.: US 10,850,531 B2
(45) Date of Patent: Dec. 1, 2020

(54) PHOTOCURABLE INK, INK CONTAINER, AND IMAGE FORMING METHOD

(71) Applicant: CANON KABUSHIKI KAISHA, Tokyo (JP)

(72) Inventors: Yoshinori Kotani, Yokohama (JP); Motokazu Kobayashi, Yokohama (JP); Takeshi Honma, Tokyo (JP); Kaori Kawa, Handa (JP); Shiori Yonezawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/146,754

(22) Filed: Sep. 28, 2018

(65) Prior Publication Data

US 2019/0031902 A1    Jan. 31, 2019

Related U.S. Application Data

(63) Continuation of application No. PCT/JP2017/010320, filed on Mar. 15, 2017.

(30) Foreign Application Priority Data

Mar. 31, 2016  (JP) .................................. 2016-072980
Jan. 18, 2017  (JP) .................................. 2017-006980

(51) Int. Cl.
  *C09D 11/322*  (2014.01)
  *B41J 2/175*  (2006.01)
  (Continued)

(52) U.S. Cl.
  CPC ......... *B41J 2/2107* (2013.01); *B41J 2/17503* (2013.01); *B41J 11/002* (2013.01);
  (Continued)

(58) Field of Classification Search
  CPC ....... C09D 11/38; C09D 11/10; C09D 11/107; C09D 11/101; C09D 11/037;
  (Continued)

(56) References Cited

U.S. PATENT DOCUMENTS

6,283,589 B1 * 9/2001 Gelbart ............... B41J 11/0015
                                                                    347/100
2007/0155882 A1   7/2007 Yamaguchi et al.
(Continued)

FOREIGN PATENT DOCUMENTS

EP    1036831 A1    9/2000
EP    2787046 A1    10/2014
(Continued)

OTHER PUBLICATIONS

Science Company; Deionized Water Material Safety Data Sheet (Dec. 29, 2009) pp. 1-7 (2009).*
(Continued)

*Primary Examiner* — Manish S Shah
(74) *Attorney, Agent, or Firm* — Canon U.S.A., Inc. IP Division (57) ABSTRACT

A photocurable ink contains a polymerizable compound and a photopolymerization initiator, and this ink contains a low boiling point solvent having a boiling point of 40° C. to 120° C. at one atmospheric pressure and at least one particle having a surface on which an unsaturated hydrocarbon group is provided.

16 Claims, 2 Drawing Sheets

(51) Int. Cl.
  *B41J 11/00* (2006.01)
  *B41J 2/21* (2006.01)
  *C09D 11/10* (2014.01)
  *B41M 7/00* (2006.01)
  *C09D 11/38* (2014.01)
  *B41M 5/00* (2006.01)
  *C09D 11/033* (2014.01)
  *C09D 11/037* (2014.01)
  *C09D 11/101* (2014.01)
  *C09D 11/107* (2014.01)

(52) U.S. Cl.
  CPC ........ *B41M 5/0023* (2013.01); *B41M 7/0081* (2013.01); *C09D 11/033* (2013.01); *C09D 11/037* (2013.01); *C09D 11/10* (2013.01); *C09D 11/101* (2013.01); *C09D 11/107* (2013.01); *C09D 11/322* (2013.01); *C09D 11/38* (2013.01)

(58) Field of Classification Search
  CPC ..... C09D 11/033; C09D 11/322; C09D 11/36; C09D 11/40; C09D 11/30; C09D 11/32; C09D 11/324; C09D 11/328; C09D 11/102; C09D 11/005; C09D 11/54; C09D 11/52; B41M 7/0081; B41M 5/0023; B41M 5/0011; B41M 5/0017; B41M 5/0047; B41M 7/00; B41M 7/0072; B41M 5/52; B41M 5/5218; B41J 11/002; B41J 2/17503; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 2/161; B41J 2/1623; B41J 2202/00; B41J 2202/03; B41J 2/14201; B41J 2/045
  See application file for complete search history.

(56) References Cited

U.S. PATENT DOCUMENTS

| | | | | |
|---|---|---|---|---|
| 2008/0248196 | A1* | 10/2008 | Anderson | B41M 7/0045 427/203 |
| 2009/0085960 | A1* | 4/2009 | Yahiro | B41J 2/2114 347/21 |
| 2010/0194838 | A1* | 8/2010 | Mitsuzawa | B41J 2/2114 347/102 |
| 2011/0249055 | A1* | 10/2011 | Sasada | C09D 11/101 347/20 |
| 2012/0200653 | A1* | 8/2012 | Shimohara | B41J 2/2107 347/102 |
| 2012/0225968 | A1 | 9/2012 | Nakano et al. | |
| 2012/0287211 | A1* | 11/2012 | Sano | B41J 3/407 347/100 |
| 2014/0192112 | A1* | 7/2014 | Nagashima | B41J 2/01 347/21 |

FOREIGN PATENT DOCUMENTS

| | | |
|---|---|---|
| JP | 2003514060 A | 4/2003 |
| JP | 2005-298757 A | 10/2005 |
| JP | 2006199929 A | 8/2006 |
| JP | 2006206875 A | 8/2006 |
| JP | 2006282762 A | 10/2006 |
| JP | 2007224103 A | 9/2007 |
| JP | 2012-001581 A | 1/2012 |
| JP | 2012-001582 A | 1/2012 |
| JP | 2014077081 A | 5/2014 |
| JP | 2014172946 A | 9/2014 |
| WO | 01/0157145 A1 | 8/2001 |
| WO | 2016052053 A1 | 4/2016 |
| WO | 2017038244 A1 | 3/2017 |

OTHER PUBLICATIONS

LabChem Inc. Deionized Water Material Safety Data Sheet (Apr. 11, 1999) pp. 1-5 (1999).*

LabChem Inc. Water Safety Data Sheet (Mar. 26, 2012) pp. 1-5 (2012).*

* cited by examiner

PHOTOCURABLE INK, INK CONTAINER, AND IMAGE FORMING METHOD

CROSS-REFERENCE TO RELATED APPLICATIONS

This application is a Continuation of International Patent Application No. PCT/JP2017/010320, filed Mar. 15, 2017, which claims the benefit of Japanese Patent Application No. 2016-072980, filed Mar. 31, 2016, and No. 2017-006980, filed Jan. 18, 2017, which are hereby incorporated by reference herein in their entirety.

TECHNICAL FIELD

The present invention relates to a photocurable ink, an ink container, an image forming method, and the like.

BACKGROUND ART

Recently, in the commercial printing market, a method for forming an image on a non-white recording medium (substrate), such as a transparent or a semi-transparent film or colored paper, has been strongly desired. In order to form an image on those non-white recording media, a white color image is required to be formed.

As an ink forming a white color image, a photocurable ink containing a polymerizable compound and a low boiling point solvent has been proposed (PTL 1). According to PTL 1, since the low boiling point solvent is evaporated when the photocurable ink is cured, a cured film obtained by curing the photocurable ink is a porous film in which many voids are present therein. Since light is scattered by the above many voids, the cured film shows white color.

CITATION LIST

Patent Literature

PTL 1: Japanese Patent Laid-Open No. 2005-298757

However, when a white color film is formed on a substrate by forming a porous film, for example, using the technique disclosed in PTL 1, since the contact area between the film and the substrate is decreased and the like, the adhesion between the film and the substrate is disadvantageously decreased in some cases.

Accordingly, in consideration of the problem described above, the present invention provides a photocurable ink which forms a porous cured material and which is excellent in adhesion between the cured material and a substrate.

SUMMARY OF INVENTION

A photocurable ink according to one aspect of the present invention is a photocurable ink which contains a polymerizable compound and a photopolymerization initiator, and this ink contains a low boiling point solvent having a boiling point of 40° C. to 120° C. at one atmospheric pressure and at least one particle having a surface on which an unsaturated hydrocarbon group is provided.

Further features of the present invention will become apparent from the following description of exemplary embodiments with reference to the attached drawings.

DESCRIPTION OF EMBODIMENTS

Hereinafter, embodiments of the present invention will be described in detail. In addition, the present invention is not limited to the following embodiments; without departing from the scope of the present invention, the embodiments may be appropriately modified, improved, and the like based on the knowledge of a person skilled in the art; and those thus modified, improved, and the like are also included in the scope of the present invention.

<Photocurable Ink>

A photocurable ink 10 (hereinafter, referred to as "ink 10") according to this embodiment is a photocurable ink containing a polymerizable compound (A), a photopolymerization initiator (B), and a low boiling point solvent (C), and the photocurable ink 10 contains at least one particle (P) having a surface on which an unsaturated hydrocarbon group is provided. In addition, in the following description, the "photocurable ink" may be simply called the "ink" in some cases.

The ink 10 is disposed on a substrate and is then irradiated with light. As a result, by the photopolymerization initiator (B) in the ink 10, a polymerization reaction of the polymerizable compound (A) is initiated. As the polymerization reaction of the polymerizable compound (A) proceeds, the ink 10 is cured to form a cured material. Although the ink 10 contains the low boiling point solvent (C), while and/or after the ink 10 is cured, the low boiling point solvent (C) is evaporated. Accordingly, portions at each of which the low boiling point solvent (C) is present remain in the form of voids, so that a porous cured material in which many voids are present is formed. Hence, by those voids thus formed, light incident on the cured material is, for example, diffusely reflected, so that the cured material shows white color.

In addition, as the substrate having a surface on which the ink 10 is disposed and is formed into the cured material, for example, there may be used paper, a polymer material, such as a polyvinyl chloride or a PET, a metal, a wood, a cloth, a glass, or a ceramic. In addition, the shape of the substrate is not particularly limited and may be either a film or a plate, or another three-dimensional material may also be used. In this embodiment, among those mentioned above, a film, a plate, or a three-dimensional material each formed of a polymer material is preferably used as the substrate.

In addition, the "cured material" in this specification indicates a partially or a fully cured material obtained by polymerization of the polymerizable compound (A) contained in the ink 10. In addition, among cured materials, when a cured material having an extremely small thickness with respect to the area thereof is emphasized, this cured material may be particularly called a "cured film" in some cases.

Hereinafter, the individual components contained in the ink 10 will be described in detail.

[Polymerizable Compound]

The polymerizable compound (A) contained in the ink 10 is a compound which reacts with polymerizing factors (such as radicals) generated from the photopolymerization initiator (B) to be described below and which forms a cured material from a high molecular weight compound (polymer) by a chain reaction (polymerization reaction).

The polymerizable compound (A) has a polymerizable functional group. In this specification, the polymerizable functional group indicates a functional group capable of performing polymerization. The polymerizable functional group of the polymerizable compound (A) is preferably a polymerizable functional group capable of performing radical polymerization, and in particular, an ethylenic unsaturated group is more preferable. As the polymerizable functional group of the polymerizable compound (A), in particular, an acryloyl group, a methacryloyl group, a vinyl group, an allyl group, or a vinyl ether group is specifically preferable.

The polymerizable compound (A) contained in the ink 10 may include either one polymerizable compound or a plurality of types of polymerizable compounds. In addition, when a plurality of types of polymerizable compounds is contained, the blend rate of the polymerizable compound to the ink 10 is calculated based on the total mass of the plurality of types of polymerizable compounds.

In addition, the polymerizable compound (A) is not particularly limited as long as being a compound having a polymerizable functional group, and a monomer, an oligomer, a polymer, and a mixture thereof may be used. When a solid polymerizable compound is used, this solid polymerizable compound is preferably used after being mixed with and dissolved in a liquid polymerizable compound.

In addition, the boiling point of the polymerizable compound (A) is preferably higher than 120° C.

As the polymerizable compound described above, for example, a radical polymerizable compound may be mentioned. As the radical polymerizable compound, a compound having at least one of an acryloyl group or a methacryloyl group each functioning as a polymerizable functional group, that is, a (meth)acryl compound, is particularly preferable.

As a monofunctional (meth)acryl compound having an acryloyl group or a methacryloyl group, for example, there may be mentioned phenoxy ethyl (meth)acrylate, phenoxy-2-methylethyl (meth)acrylate, phenoxy ethoxyethyl (meth)acrylate, 3-phenoxy-2-hydroxypropyl (meth)acrylate, 2-phenylphenoxy ethyl (meth)acrylate, 4-phenylphenoxy ethyl (meth)acrylate, 3-(2-phenylphenyl)-2-hydroxypropyl (meth)acrylate, (meth)acrylate of EO-modified p-cumylphenol, 2-bromophenoxy ethyl (meth)acrylate, 2,4-dibromophenoxy ethyl (meth)acrylate, 2,4,6-tribromophenoxy ethyl (meth)acrylate, EO-modified phenoxy (meth)acrylate, PO-modified phenoxy (meth)acrylate, polyoxyethylene nonylphenyl ether (meth)acrylate, isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, 1-naphthylmethyl (meth)acrylate, 2-naphthylmethyl (meth)acrylate, tetrahydrofurfuryl (meth)acrylate, butoxyethyl (meth)acrylate, ethoxy diethylene glycol (meth)acrylate, polyethylene glycol mono (meth)acrylate, polypropylene glycol mono(meth)acrylate, methoxy ethylene glycol (meth)acrylate, ethoxyethyl (meth) acrylate, methoxy polyethylene glycol (meth)acrylate, methoxy polypropylene glycol (meth)acrylate, diacetone (meth)acrylamide, isobutoxy methyl (meth)acrylamide, N,N-dimethyl(meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, and N,N-dimethylaminopropyl(meth)acrylamide; however, the above monofunctional (meth)acryl compound is not limited thereto.

As a commercially available product of the monofunctional (meth)acryl compound described above, for example, ARONIX M101, M102, M110, M111, M113, M117, M5700, TO-1317, M120, M150, and M156 (manufactured by Toagosei Co., Ltd., "ARONIX" is the registered trade name); MEDOL10, MIBDOL10, CHDOL10, MMDOL30, MEDOL30, MIBDOL30, CHDOL30, LA, IBXA, 2-MTA, HPA, and Viscoat #150, #155, #158, #190, #192, #193, #220, #2000, #2100, and #2150 (manufactured by Osaka Organic Chemical Industry Ltd.); LIGHT ACRYLATE BO-A, EC-A, DMP-A, THF-A, HOP-A, HOA-MPE, HOA-MPL, PO-A, P-200A, NP-4EA, and NP-BEA, and EPDXY ESTER M-600A (manufactured by Kyoeisha Chemical Co., Ltd.); KAYARAD TC110S, R-564, and R-128H (manufactured by NIPPON KAYAKU Co., Ltd.); NK ESTER AMP-10G and AMP-20G (manufactured by Shin-Nakamura Chemical Co., Ltd.); FA-511A, 512A, and 513A (manufactured by Hitachi Chemical Co., Ltd.); PHE, CEA, PHE-2, PHE-4, BR-31, BR31-M, and BR-32 (manufactured by Dai-Ichi Kogyo Seiyaku Co., Ltd.); VP (manufactured by BASF); and ACMO, DMAA, and DMAPAA (manufactured by KOHJIN Holdings Co., Ltd.) may be mentioned, but not limited thereto.

As a polyfunctional (meth)acryl compound having at least two acryloyl groups or methacryloyl groups, for example, trimethylolpropane di(meth)acrylate, trimethylolpropane tri(meth)acrylate, EO-modified trimethylolpropane tri(meth)acrylate, PO-modified trimethylolpropane tri(meth)acrylate, EO- and PO-modified trimethylolpropane tri(meth)acrylate, dimethylol tricyclodecane diacrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth) acrylate, 1,3-adamantane dimethanol diacrylate, o-xylene di(meth)acrylate, m-xylene di(meth)acrylate, p-xylene di(meth)acrylate, 1,9-nonanediol diacrylate, 1,10-decanediol diacrylate, tris(2-hydroxyethyl) isocyanurate tri(meth) acrylate, tris(acryloyloxy) isocyanurate, bis(hydroxymethyl) tricyclodecane di(meth)acrylate, dipentaerythritol penta (meth)acrylate, dipentaerythritol hexa(meth)acrylate, EO-modified 2,2-bis(4-((meth)acryloxy)phenyl)propane, PO-modified 2,2-bis(4-((meth)acryloxy)phenyl)propane, and EO- and PO-modified 2,2-bis(4-((meth)acryloxy)phenyl)propane may be mentioned, but not limited thereto.

As a commercially available product of the polyfunctional (meth)acryl compound described above, for example, YUPIMER UV SA1002 and SA2007 (manufactured by Mitsubishi Chemical Corporation, "YUPIMER" is the registered trade name); Viscoat #195, #230, #215, #260, #335HP, #295, #300, #360, #700, GPT, and 3PA (manufactured by Osaka Organic Chemical Industry Ltd.); LIGHT ACRYLATE 4EG-A, 9EG-A, NP-A, DCP-A, BP-4EA, BP-4PA, TMP-A, PE-3A, PE-4A, and DPE-6A (manufactured by Kyoeisha Chemical Co., Ltd.); A-DCP, A-HD-N, A-NOD-N, and A-DOD-N (manufactured by Shin-Nakamura Chemical Co., Ltd.); KAYARAD PET-30, TMPTA, R-604, DPHA, DPCA-20, -30, -60, -120, HX-620, D-310, and D-330 (manufactured by NIPPON KAYAKU Co., Ltd.); ARONIX M208, M210, M215, M220, M240, M305, M309, M310, M315, M325, and M400 (manufactured by Toagosei Co., Ltd.); and Ripoxy VR-77, VR-60, and VR-90 (manufactured by Showa Denko K.K., "Ripoxy" is the registered trade name) may be mentioned, but not limited thereto.

In addition, in the compound groups described above, the "(meth)acrylate" represents an acrylate or a methacrylate having an alcohol residue equivalent to that thereof. The "(meth)acryloyl group" represents an acryloyl group or a methacryloyl group having an alcohol residue equivalent to that thereof. EO represents an ethylene oxide, and an EO-modified compound A represents a compound in which a (meth)acrylic acid residue of the compound A is bonded to an alcohol residue thereof with a block structure of an ethylene oxide group interposed therebetween. In addition, PO represents a propylene oxide, and a PO-modified compound B represents a compound in which a (meth)acrylic acid residue of the compound B is bonded to an alcohol residue thereof with a block structure of a propylene oxide group interposed therebetween.

The blend rate of the polymerizable compound (A) in the ink 10 is preferably 30 to 90 percent by mass when the total mass of the ink 10 is set to 100 percent by mass. In addition, the blend rate described above is more preferably 40 to 80 percent by mass. When the blend rate of the polymerizable compound (A) in the ink 10 is set to 30 percent by mass or more with respect to the total mass of the ink, the mechanical strength of a cured material to be formed can be increased.

[Photopolymerization Initiator]

The photopolymerization initiator (B) contained in the ink 10 is a compound which senses light having a predetermined wavelength (active energy rays) and generates polymerizing factors (such as radicals). In particular, the photopolymerization initiator is a polymerization initiator which generates polymerizing factors by active energy rays such as light (infrared rays, visible rays, ultraviolet rays, far ultraviolet rays, X-rays, charged particle rays including electron rays, radiation rays, or the like). In more particular, the photopolymerization initiator (B) preferably includes a polymerization initiator which generates polymerizing factors by light having a wavelength of, for example, 150 to 400 nm.

The photopolymerization initiator contained in the ink 10 may include either one photopolymerization initiator or a plurality of types of photopolymerization initiators. In addition, when a plurality of types of photopolymerization initiators is contained, the blend rate of the photopolymerization initiator in the ink 10 is calculated based on the total mass of the plurality of types of photopolymerization initiators.

As the photopolymerization initiator described above, for example, a radical generator may be mentioned.

As the radical generator, for example, there may be mentioned substituted or unsubstituted 2,4,5-triaryl imidazole dimmers, such as a 2-(o-chlorophenyl)-4,5-diphenylimidazole dimer, a 2-(o-chlorophenyl)-4,5-di(methoxyphenyl)imidazole dimer, a 2-(o-fluorophenyl)-4,5-diphenylimidazole dimer, and a 2-(o- or p-methoxyphenyl)-4,5-diphenylimidazole dimer; benzophenone derivatives, such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenone, 4,4'-dimethoxybenzophenone, and 4,4'-diaminobenzophenone; α-amino aromatic ketone derivatives, such as 2-benzyl-2-dimethylamino-1-(4-morpholinophenyl)-butanone-1 and 2-methyl-1-[4-(methylthio)phenyl]-2-morpholino-propane-1-on; quinones, such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthrenequinone, 2-methyl-1,4-naphthoquinone, and 2,3-dimethylanthraquinone; benzoin ether derivatives, such as benzoin methyl ether, benzoin ethyl ether, and benzoin phenyl ether; benzoin derivatives, such as benzoin, methyl benzoin, ethyl benzoin, and propyl benzoin; benzyl derivatives, such as benzyl dimethyl ketal; acridine derivatives, such as 9-phenyl acridine and 1,7-bis(9,9'-acridinyl)heptane; N-phenyl glycine derivatives such as N-phenyl glycine; acetophenone derivatives, such as acetophenone, 3-methyl acetophenone, acetophenone benzyl ketal, 1-hydroxycyclohexyl phenyl ketone, and 2,2-dimethoxy-2-phenyl acetophenone; thioxanthone derivatives, such as thioxanthone, diethylthioxanthone, 2-isopropylthioxanthone, and 2-chlorothioxanthone; acylphosphine oxide derivatives, such as 2,4,6-trimethylbenzoyl diphenylphosphine oxide, bis(2,4,6-trimethylbenzoyl)phenylphosphine oxide, and bis-(2,6-dimethoxybenzoyl)-2,4,4-trimethylpentylphosphine oxide; oxime ester derivatives, such as 1,2-oxtanedione, 1-[4-(phenylthio)-, 2-(O-benzoyl oxime)] and ethanone, 1-[9-ethyl-6-(2-methylbenzoyl)-9H-carbazol-3-yl]-, 1-(O-acetyl oxime); and xanthone, fluorenone, benzaldehyde, fluorene, anthraquinone, triphenylamine, carbazole, 1-(4-isopropylphenyl)-2-hydroxy-2-methylpropan-1-on, and 2-hydroxy-2-methyl-1-phenylpropan-1-on; however, the radical generator is not limited thereto.

As a commercially available product of the radical generator, for example, Irgacure184, 369, 651, 500, 819, 907, 784, and 2959, CGI-1700, -1750, and -1850, CG24-61, Darocur1173, LucirinTPO, LR8893, and LR8970 (manufactured by BASF, "Darocur" and "Lucirin" are each the registered trade name); and EBECRYLP36 (manufactured by UCB) may be mentioned, but not limited thereto.

When the total mass of the ink is set to 100 percent by mass, the blend rate of the photopolymerization initiator is preferably 0.01 to 15 percent by mass and more preferably 0.1 to 10 percent by mass.

Since the blend rate of the photopolymerization initiator is set to 0.01 percent by mass or more with respect to the total mass of the ink, a curing rate of the ink is increased, and hence, the reaction efficiency can be increased. In addition, since the blend rate described above is set to 15 percent by mass or less with respect to the total mass of the ink, the mechanical strength of a cured material to be formed can be increased.

[Low Boiling Point Solvent]

The low boiling point solvent (C) contained in the ink 10 is a component which is evaporated while and/or after the ink 10 is cured. Accordingly, portions at each of which the low boiling point solvent (C) is present remain in the form of voids, and hence, the cured material is a porous cured material in which many voids are present.

As described above, the low boiling point solvent (C) is evaporated while and/or after the ink 10 is cured. In view of the efficiency of the evaporation, the boiling point of the low boiling point solvent (C) is preferably 40° C. to 120° C. In addition, in this embodiment, the "boiling point" indicates a boiling point at one atmospheric pressure, and the "low boiling point" indicates a boiling point of 120° C. or less. In addition, in this embodiment, the low boiling point solvent (C) is a compound having no polymerizable functional group, such as an acryloyl group, a methacryloyl group, a vinyl group, an allyl group, or a vinyl ether group.

As particular examples of the low boiling point solvent (C), for example, water; alcohols, such as ethanol, 2-propanol, and butanol; various aliphatic or alicyclic hydrocarbons, such as n-hexane, n-octane, cyclohexane, and cyclopentane; various aromatic hydrocarbons, such as toluene; various esters, such as ethyl formate and ethyl acetate; various ketones, such as acetone, methyl ethyl ketone, and methyl isobutyl ketone; various ethers, such as dimethoxy ethane, tetrahydrofuran, dioxane, and diisopropyl ether; and various chlorinated hydrocarbons, such as chloroform, methylene chloride, and carbon tetrachloride may be mentioned, but not limited thereto. In addition, those low boiling point solvents may be used alone, or at least two types thereof may be used in combination.

Although the low boiling point solvent (C) may be a liquid either compatible or incompatible with the polymerizable compound (A) and the photopolymerization initiator (B), a liquid incompatible therewith is preferable. Since the polymerizable compound (A) and the photopolymerization initiator (B) are each an oily liquid (O), as the low boiling point solvent (C), a water-containing aqueous liquid (W) incompatible with the oily liquid (O) is preferably used.

As described above, since the aqueous liquid (W) is used as the low boiling point solvent (C), the interface between the aqueous liquid (W) and the oily liquid (O) is generated, so that the ink 10 can be placed in the state in which liquid droplets 101 are formed from the aqueous liquid (W) and are dispersed in the oily liquid (O). That is, the ink 10 is placed in the state in which the liquid droplets 101 formed by a liquid including the low boiling point solvent (C) are dispersed in the ink 10 (in the photocurable ink). Since the liquid including the low boiling point solvent (C) forms the liquid droplets 101, and the liquid droplets 101 thus formed are dispersed in the ink 10 as described above, the sizes of voids in the cured material formed by the evaporation of the low boiling point solvent (C) can be increased. In addition, when the sizes (particle diameters) of the liquid droplets 101 of the liquid including the low boiling point solvent (C) are controlled, the sizes of the voids in the cured material can be controlled. Accordingly, the degree of whiteness of the cured material obtained by curing the ink 10 can be improved.

In addition, the ink 10 is preferably an emulsion (so-called W/O emulsion) in which liquid droplets are formed by the aqueous liquid (W) and are dispersed in the oily liquid (O). In other words, the ink 10 is preferably an emulsion in which the liquid droplets 101 formed by the liquid including the low boiling point solvent (C) are dispersed in the ink 10 (in the photocurable ink). When the ink 10 is the emulsion as described above, it is preferable since the sizes and the dispersibility of the liquid droplets 101 formed by the liquid including the low boiling point solvent (C) can be stably maintained. That is, it is preferable since the storage stability of the ink 10 is improved.

When the total mass of the ink 10 is set to 100 percent by mass, the blend rate of the low boiling point solvent (C) in the ink 10 is preferably 10 to 50 percent by mass and more preferably 10 to 40 percent by mass. Furthermore, the blend rate of the low boiling point solvent (C) is further preferably 10 to 30 percent by mass and particularly preferably 15 to 25 percent by mass. When the blend rate of the low boiling point solvent (C) in the ink 10 is set to 10 percent by mass or more, the volume of the voids formed in the cured material can be increased, and the degree of whiteness of the cured material can be increased. In addition, when the blend rate of the low boiling point solvent (C) in the ink 10 is more than 50 percent by mass, the mechanical strength of the cured material may be decreased in some cases.

[Particles]

Besides the components described above, the ink 10 contains at least one particle (P) having a surface on which an unsaturated hydrocarbon group is provided.

The type of particle (P) is not particularly limited as long as an unsaturated hydrocarbon group is provided on the particle surface. That is, the particle (P) may be either an organic particle having a surface on which an unsaturated hydrocarbon group is provided or an inorganic particle having a surface on which an unsaturated hydrocarbon group is provided. The particle (P) preferably has a surface to which an unsaturated hydrocarbon group is bonded directly or indirectly with another atomic group interposed therebetween.

As examples of the organic particle having a surface on which an unsaturated hydrocarbon group is provided, for example, there may be mentioned a resin particle which is surface-modified with a surface modifier containing an unsaturated hydrocarbon group or a resin particle containing a resin having an unsaturated hydrocarbon group. The resin particle may be either a solid particle having no voids therein or a hollow particle having voids therein. In addition, the type of resin is not particularly limited, and for example, an acrylic resin, a styrene resin, or a styrene-acrylic resin may be mentioned.

As examples of the inorganic particle having a surface on which an unsaturated hydrocarbon group is provided, for example, there may be mentioned an inorganic particle which is surface-modified with a surface modifier containing an unsaturated hydrocarbon group. As the inorganic particle, for example, although there may be mentioned a titanium oxide particle, a silicon dioxide particle (silica particle), a zirconium oxide particle, an aluminum oxide particle, a zinc oxide particle, or a barium titanate particle, the inorganic particle is not limited thereto. In addition, those inorganic particles may be used alone, or at least two types thereof may be used in combination.

The particle (P) is preferably an inorganic particle having a surface on which an unsaturated hydrocarbon group is provided. The reason for this is that many types of inorganic particles have a high refractive index, and when inorganic particles having a high refractive index are used, the degree of whiteness and the shielding property of the cured material can be improved. In particular, a titanium oxide particle having a surface on which an unsaturated hydrocarbon group is provided is preferable.

When a photocurable ink containing the polymerizable compound (A), the photopolymerization initiator (B), and the low boiling point solvent (C) is disposed on the substrate and is then irradiated with light as described above, the polymerization reaction of the polymerizable compound (A) and the evaporation of the low boiling point solvent (C) occur, so that a porous cured material is formed. In this case, the cured material is adsorbed on the substrate by the interaction between the substrate and a polymer formed by the polymerization of the polymerizable compound (A). However, in the porous cured material, since voids are also present at the interface between the cured material and the substrate, the contact area with the substrate is decreased as compared to that of a non-porous cured material. Accordingly, the adhesion of the porous cured material to the substrate is liable to be decreased as compared to that of the non-porous cured material. Hence, in the photocurable ink containing the low boiling point solvent (C), the adhesion to the substrate is a particularly significant subject.

However, besides the polymerizable compound (A), the photopolymerization initiator (B), and the low boiling point solvent (C), the ink 10 according to this embodiment contains the particle (P) having a surface on which an unsaturated hydrocarbon group is provided.

Although the unsaturated hydrocarbon group provided on the particle (P) is not particularly limited, for example, a vinyl group, an acryloyl group, a methacryloyl group, or a styryl group may be mentioned. Those unsaturated hydrocarbon groups each interact with a substrate formed of a polymer material, such as a PET, to have an adhesion thereto. In addition, the particle (P) is surrounded by a polymer generated by the polymerization of the polymerizable compound (A) in the cured material and is buried therein. Hence, it is estimated that since the particle (P) having a surface on which an unsaturated hydrocarbon group is provided functions as an anchor between the cured material and the substrate, by this anchor effect, the adhesion between the cured material and the substrate can be improved.

The mechanism of the adhesion generated between the substrate and the particle (P) provided with an unsaturated hydrocarbon group is estimated by the present inventors as described below. When the ink 10 is disposed on the substrate, the components, such as the polymerizable compound (A) and the particle (P), of the ink 10 permeate the inside of the substrate. In the state described above, when the ink 10 is cured by irradiation of light, the ink 10 is cured while partially permeating the inside of the substrate. Hence, the contact area between the cured material and the substrate is increased, and as a result, the effect of the interaction between the unsaturated hydrocarbon group and the substrate is enhanced.

In addition, the polymerizable compound (A) also preferably has the unsaturated hydrocarbon group provided on the particle (P). Since the polymerizable compound (A) has the same unsaturated hydrocarbon group as that provided on the particle (P), when the polymer is formed by polymerization of the polymerizable compound (A), a polymerization reaction with the unsaturated hydrocarbon group provided on the particle (P) occurs, and the above anchor effect can be more effectively obtained. As a result, the adhesion between the cured material and the substrate can be more enhanced. As described above, since the polymerizable compound (A) preferably has an acryloyl group or a methacryloyl group, the unsaturated hydrocarbon group provided on the particle (P) is more preferably an acryloyl group or a methacryloyl group.

The average particle diameter of the particles (P) is preferably 5 to 100 nm. When the average particle diameter of the particles (P) is more than 100 nm, in particular, in the case of inorganic particles having a high specific gravity, the particles (P) may be unfavorably precipitated in the ink 10. In addition, the average particle diameter of the particles (P) may be measured, for example, by a dynamic light scattering method.

When the total mass of the ink 10 is set to 100 percent by mass, the content of the particles (P) in the ink 10 is preferably 1 to 20 percent by mass and more preferably 5 to 15 percent by mass. When the content of the particles (P) in the ink 10 is more than 20 percent by mass, the storage stability of the ink is degraded. On the other hand, when the content of the particles (P) in the ink 10 is less than 1 percent by mass, the effect of improving the adhesion to the substrate cannot be sufficiently obtained.

The ink 10 preferably contains a plurality of particles (P), and the particles (P) are preferably adsorbed on the liquid droplets 101 (on the liquid droplets) formed by the liquid including the low boiling point solvent (C). In other words, the particles (P) are preferably aligned along the interface formed between a first liquid (oily liquid (O)) and a second liquid (aqueous liquid (W)). When the particles (P) are adsorbed on the liquid droplets 101 as described above, even if at least two liquid droplets 101 on which the particles (P) are adsorbed along the respective interfaces thereof come close to each other, the particles (P) adsorbed along the respective interfaces are sterically repelled to each other, and hence, the liquid droplets 101 are suppressed from coalescing together. Accordingly, for a long period of time, the liquid droplets 101 can be maintained to have a desired size, and the storage stability of the ink 10 can be improved. A phenomenon in which the dispersion state of the liquid droplets is stabilized by particles as described above is known as a Pickering emulsion and can be realized by appropriate control of the wettability and the particle diameter of the particles (P).

(Surface Modifier)

The particle (P) can be obtained in such a way that a particle surface of an organic particle or an inorganic particle is modified with a surface modifier having an unsaturated hydrocarbon group. As the surface modifier having an unsaturated hydrocarbon group, for example, an alkoxysilane compound having an unsaturated hydrocarbon group and an alkoxy group may be used. In addition, a silane compound having an unsaturated hydrocarbon group and a silanol group may also be used. In addition, in the following description, those compounds described above may be collectively called a silane coupling agent in some cases.

As the alkoxysilane compound, besides a functional group including an unsaturated hydrocarbon group, a trifunctional alkoxide having three alkoxy groups or a difunctional alkoxide having two alkoxy groups may also be used.

In addition, as the surface modifiers, besides the alkoxysilane compounds described above, a hydrolysis product or a condensation polymerization product of the alkoxysilane compound may also be used. The hydrolysis product or the condensation polymerization product of the alkoxysilane compound indicates a compound in which the alkoxy group of the alkoxysilane is partially or fully hydrolyzed or condensation polymerized. Since a silanol group generated by the hydrolysis of the alkoxy group is bonded to a hydroxy group or the like present on the surface of an organic particle or an inorganic particle by an intermolecular interaction, such as a covalent bond or a hydrogen bond, the surface of the organic particle or the surface of the inorganic particle can be modified with the hydrolysis product described above. The above silanol group includes a silanol group obtained by partial hydrolysis of the alkoxy group of the alkoxysilane or a silanol group in the condensation polymerization compound generated by condensation between silanol groups.

As the alkoxysilane compound, there may be preferably used a trifunctional alkoxide capable of generating a larger number of silanol groups each of which functions as a reaction point of a reaction to be performed with a functional group present on the surface of the organic particle or the inorganic particle. Accordingly, the surface of the organic particle or the inorganic particle can be efficiently modified.

As a particular example of the trifunctional alkoxysilane compound, for example, there may be mentioned a vinylsilane, such as vinyltrimethoxysilane, vinyltriethoxysilane, vinyltris(2-methoxyethoxy)silane, or triethoxyvinylsilane; a methacrylsilane, such as 3-methacryloxypropyltriethoxysilane or 3-methacryloxypropyltrimethoxysilane; an acrylsilane, such as 3-acryloxypropyltrimethoxysilane or acrylic acid 3-(trimethoxysilyl)propyl; or a styrylsilane, such as p-styryltrimethoxysilane. In addition, a compound obtained by hydrolysis or condensation polymerization of some or all of the alkoxy groups of each of those trifunctional alkoxysilane compounds may also be used. Those silane coupling agents may be used alone, or at least two types thereof may be used in combination.

(Method for Modifying Particle Surface)

First, the silane coupling agent is dissolved in an organic solvent, so that a solution of the silane coupling agent is prepared. The amount of the organic solvent to be added to the silane coupling agent is preferably set to approximately 2 to 1,000 in molar ratio with respect to the silane coupling agent. In addition, in this specification, the "addition amount of A with respect to B is X in molar ratio" indicates that the molar amount of A to be added is X times the molar amount of B".

As the organic solvent, for example, there may be mentioned alcohols, such as methanol, ethanol, 2-propanaol, butanol, and ethylene glycol; various aliphatic or alicyclic hydrocarbons, such as n-hexane, n-octane, cyclohexane, cyclopentane, and cyclooctane; various aromatic hydrocarbons, such as toluene, xylene, and ethylbenzene; various esters, such as ethyl formate, ethyl acetate, n-butyl acetate, ethylene glycol monomethyl ether acetate, ethylene glycol monoethyl ether acetate, and ethylene glycol monobutyl ether acetate; various ketones, such as acetone, methyl ethyl ketone, methyl isobutyl ketone, and cyclohexanone; various ethers, such as dimethoxyethane, tetrahydrofuran, dioxane, and diisopropyl ether; various chlorinated hydrocarbons, such as chloroform, methylene chloride, carbon tetrachloride, and tetrachloroethane; and aprotic polar solvents, such as N-methyl-pyrrolidone, dimethylformamide, dimethylacetamide, and ethylene carbonate. In this embodiment, in view of the stability of the solution of the silane coupling agent, among the above various organic solvents, an alcohol is preferably used.

A solution to be used for the surface modification of the particle is generally prepared in such a way that to an alcohol solution of the silane coupling agent, acidic catalytic water is added. As the acidic catalytic water, a hydrochloric acid may be mentioned by way of example. The pH of the acidic catalytic water is preferably 1 to 4. In order to form uniform particles, when the acidic catalytic water is added, a mixed liquid of the acidic catalytic water and an alcohol is preferably added to the alcohol solution of the silane coupling agent. The addition amount of the acidic catalytic water is preferably set to 2 to 10 in molar ratio with respect to the alkoxysilane compound.

Next, in the solution of the silane coupling agent prepared as described above, the organic particles or the inorganic particles are dispersed, so that a surface modification treatment is performed. Subsequently, after the particles are precipitated using a centrifugal machine and then washed with an alcohol several times, the particles are recovered, so that surface-modified organic particles or inorganic particles are obtained.

Furthermore, the surface-modified particles obtained in the above step are re-dispersed in an alcohol, and an alcohol solution in which the surface-modified particles are dispersed may be obtained.

[Other Additive Components]

In accordance with various applications, without deteriorating the advantages of the present invention, the ink 10 may further contain additive components. As the additive components described above, a surfactant may be mentioned. When the ink 10 contains a surfactant, for example, the dispersion stability of the liquid droplets 101 dispersed in the ink 10 may be improved, or the sizes of the liquid droplets 101 may be controlled. That is, since the ink 10 contains a surfactant, the liquid droplets 101 are suppressed from coalescing together and can be maintained for a long period of time to have a desired size.

The surfactant may include either one type of surfactant or a plurality of types of surfactants.

The surfactant is preferably a nonionic surfactant. Since the surfactant is a nonionic surfactant, a W/O emulsion in which liquid droplets of an aqueous liquid (W) are dispersed in an oily liquid (O) is likely to be formed. As the nonionic surfactant, a hydrocarbon-based surfactant may be mentioned.

As the hydrocarbon-based surfactant, for example, there may be mentioned a polyoxyalkylene alkyl ether in which an alkylene oxide having 2 to 4 carbon atoms is added to an alkyl alcohol having 1 to 50 carbon atoms.

As the polyoxyalkylene alkyl ether, for example, there may be mentioned a methyl alcohol ethylene oxide adduct, a decyl alcohol ethylene oxide adduct, a lauryl alcohol ethylene oxide adduct, a cetyl alcohol ethylene oxide adduct, an oleyl alcohol ethylene oxide adduct, a stearyl alcohol ethylene oxide adduct, or a stearyl alcohol ethylene oxide/propylene oxide adduct. In addition, the terminal group of the alkyl alcohol polyalkylene oxide adduct is not limited to a hydroxy group which can be simply manufactured by addition of a polyalkylene oxide to an alkyl alcohol. This hydroxy group may be replaced with another substituent, such as a polar functional group including a carboxy group, an amino group, a pyridyl group, a thiol group, or a silanol group or a hydrophobic functional group including an alkyl group or an alkoxy group.

As the polyoxyalkylene alkyl ether, a commercially available product may also be used. As the commercially available product, for example, NONION Series ("NONION" is the registered trade name) manufactured by NOF Corporation; BLAUNON Series and FINESURF Series manufactured by Aoki Oil Industrial Co., Ltd.; Pluriol Series ("Pluriol" is the registered trade name) manufactured by BASF; or EMULGEN Series ("EMULGEN" is the registered trade name) manufactured by Kao Corporation may be mentioned, but not limited thereto.

When the ink 10 contains a surfactant, the content thereof is, for example, preferably 0.001 to 20 percent by mass with respect to the total mass of the ink 10. The content described above is more preferably 0.01 to 10 percent by mass and further preferably 0.1 to 10 percent by mass. When the content of the surfactant is set in the range described above, the dispersion stability of the liquid droplets 101 can be improved.

[Physical Properties of Photocurable Ink]

The viscosity of the ink 10 at 25° C. is preferably 1 to 75 mPa·s. In addition, the viscosity of the ink 10 is more preferably 1 to 30 mPa·s. When the viscosity of the ink 10 is set to 1 to 75 mPa·s, the ejection stability can be improved when the ink 10 is ejected by an ink jet method.

[Method for Preparing Photocurable Ink]

Although a method for preparing the ink 10 is not particularly limited, one example of the method for preparing the ink 10 will be described. First, the polymerizable compound (A) and the photopolymerization initiator (B) are mixed together to prepare an oily liquid (O). Subsequently, the low boiling point solvent (C) is added thereto and is then stirred and mixed. Subsequently, after a dispersion of the particles (P) is further added, stirring and mixing are performed, so that the ink 10 is prepared.

For the mixing and stirring, for example, a homogenizer, an ultrasonic disperser, or a stirrer may be used. Among those mentioned above, in order to prepare an ink having a uniform quality, a homogenizer or an ultrasonic disperser is preferably used.

<Ink Container>

The ink 10 is an ink to be received in an ink container. In other words, the ink container according to this embodiment is a body receiving the ink 10. Hereinafter, the ink container according to this embodiment will be described in more detail.

The ink container according to this embodiment is an ink container receiving a photocurable ink. In this specification, the "container" is a concept including a case and a package and represents a body directly or indirectly receiving a photocurable ink. That is, the container is a body in which a photocurable ink is filled in a case or a body in which a case filled with at least a photocurable ink is sealed with a package. That is, the ink container according to this embodiment includes a case, and the ink 10 is received in this case.

The ink container is used for storage and transportation of a photocurable ink before the photocurable ink is used by an image forming device, and the photocurable ink received in the ink container is supplied to the image forming device when the ink is used.

Although the mode of the ink container is not particularly limited, for example, there may be mentioned an ink cartridge, a bag (pack), a bottle, a tank, a pot, or a can. Among those modes mentioned above, since commonly used and easily controlled to have desired moisture permeability and oxygen permeability, the ink cartridge, the bag, the bottle, or the tank is preferable, and the bag is more preferable.

Although the use mode of the ink container is not particularly limited, for example, there may be mentioned a cartridge-like mode (1) in which an ink container which is a separate component from an image forming device is fitted thereto, and in the fitted state described above, a photocurable ink is supplied from the ink container to the image forming device. In addition, there may also be mentioned a bottle-like mode (2) in which an ink composition is supplied from an ink container which is a separate component from an image forming device to an ink tank or the like of the image forming device. Furthermore, there may also be mentioned a mode (3) in which an ink container is provided as a part of an image forming device. In addition, in the case of the modes (1) and (3), image formation can be performed in such a way that from the ink container fitted to or included in the image forming device, the photocurable ink is supplied to a head of the image forming device through a connection portion, such as an ink tube, interposed therebetween. In addition, in the mode (2), after the photocurable ink is transported from the ink container to the ink tank or the like of the image forming device, image formation can be performed by supplying the photocurable ink from the ink tank to a head of the image forming device through a connection portion, such as an ink tube, interposed therebetween.

Figure 1A:
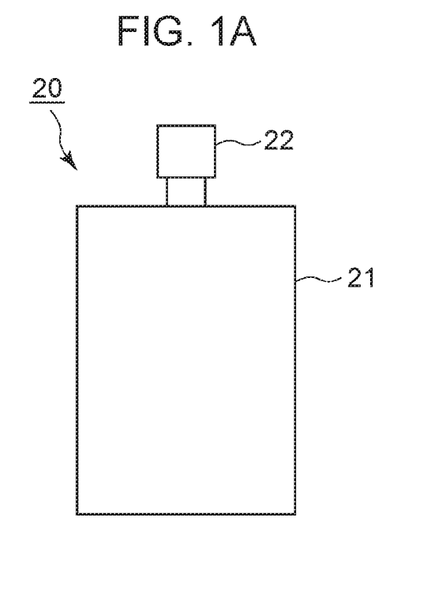
FIGS. 1A and 1B are views each showing one example of an ink container which receives a photocurable ink according to this embodiment.
Figure 1B:
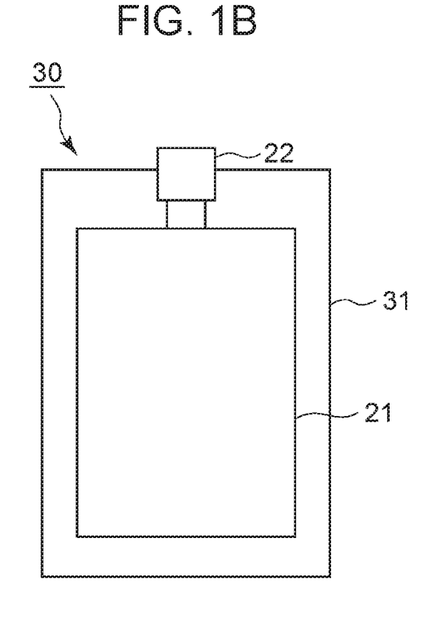

FIGS. 1A and 1B are views each showing one example of an ink container according to this embodiment; FIG. 1A shows an example of the case in which the ink container is an ink bag; and FIG. 1B shows an example of the case in which the ink container is an ink cartridge.

As shown in FIG. 1A, an ink bag 20 according to this embodiment includes a bag 21 receiving the ink 10 and an ink supply port 22 communicating with the inside of the bag 21. The ink 10 received in the ink bag 20 is supplied to an image forming device through the ink supply port 22. In addition, in the state in which the ink bag 20 is not fitted to the image forming device, an opening of the ink supply port 22 is preferably closed by a valve provided inside.

Although the shape, the size, the structure, the material, and the like of the bag 21 are not particularly limited, a bag formed of a film having a low air permeability is preferable. As the film described above, for example, an aluminum laminate film or a resin film, such as a polyamide film, a polyethylene terephthalate (PET) film, a polyethylene film, a polypropylene film, a polystyrene film, an ethylene-vinyl acetate polymer film, an ethylene-vinyl alcohol copolymer film, or a polybutadiene film, may be preferably used.

As shown in FIG. 1B, an ink cartridge 30 according to this embodiment includes the ink bag 20 described above and a case 31 which receives and protects the ink bag 20. In this case, the ink supply port 22 of the ink bag 20 is exposed to the outside of the case 31 through a cutaway portion provided in a side surface portion of the case 31. In addition, in the state in which the ink cartridge 30 is fitted to a cartridge holder of an image forming device, the ink 10 is configured to be supplied to the image forming device through the ink supply port 22. As described above, since the ink container is formed as the ink cartridge so as to be detachably fitted to the image forming device, the operation efficiency of replenishment, exchange, and the like of the photocurable ink can be further improved. In addition, the ink cartridge 30 may further include a recording head having an ejection port which communicates with the ink supply port 22.

<Image Forming Method>

An image forming method according to this embodiment is a method in which the ink 10 according to this embodiment described above is disposed on the substrate to form an image. In more particular, the image forming method according to this embodiment includes a step (disposition step) of disposing the ink 10 on a substrate 102 functioning as a recording medium and a step (light irradiation step) of irradiating the ink 10 disposed on the substrate 102 with light. In addition, the "image" described in this specification also includes a solid pattern in which a certain region is fully painted with one single color.

Hereinafter, the image forming method according to this embodiment will be described with reference to FIGS. 2A to 2D. FIGS. 2A to 2D are views each schematically showing the image forming method according to this embodiment. In this embodiment, as the ink 10, a photocurable ink in which the liquid droplets 101 formed by a liquid including the low boiling point solvent (C) are dispersed in the ink 10 (in the photocurable ink) is used.

[1] Step of Disposing Ink 10 on Recording Medium 102 (Disposition Step)

In this step, the ink 10 is disposed on the substrate 102. The ink 10 is preferably disposed on the substrate 102 after being ejected from an ink jet-type recording head. Sine the ink 10 is ejected from the ink jet-type recording head and is then disposed, the resolution of an image to be formed is increased. Although a method in which the ink is ejected by an ink jet method is not particularly limited, since the ink 10 contains the polymerizable compound (A), a method (piezo-jet method) which ejects a liquid droplet by applying mechanical energy to the ink is preferable.

In addition, the type of substrate 102 functioning as a recording medium is not particularly limited, and for example, paper, a polymer material, such as polyvinyl chloride or a PET, a metal, a wood, a cloth, a glass, or a ceramic may be used. In addition, the shape of the substrate is not particularly limited and may be either a film or a plate, or another three-dimensional material may also be used.

[2] Step of Irradiating Ink 10 Disposed on Substrate 102 with Light (Light Irradiation Step)

Figure 2A:
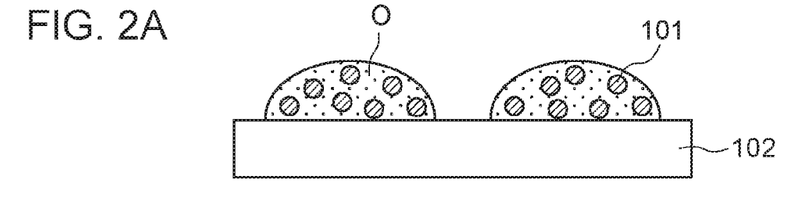
FIGS. 2A to 2D are views each schematically showing an image forming method using the photocurable ink according to this embodiment.
Figure 2B:
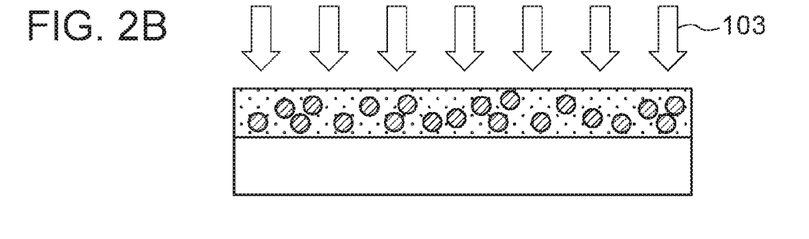

After the ink 10 is landed and disposed on the substrate 102 (FIG. 2A), as shown in FIG. 2B, light 103, such as ultraviolet rays, is irradiated. Accordingly, the ink 10 is cured.

In this step, the type of light 103 to be irradiated is not particularly limited and may be selected in accordance with a sensitive wavelength of the ink 10. In particular, ultraviolet rays having a wavelength of 150 to 400 nm, X-rays, electron rays, or the like are preferably appropriately selected and used.

Among those mentioned above, as the light to be irradiated on the ink 10, ultraviolet rays are particularly preferable. The reason for this is that many compounds commercially sold as a photopolymerization initiator have sensitivity to ultraviolet rays. In addition, as a light source emitting ultraviolet rays, for example, although a high pressure mercury lamp, an ultrahigh pressure mercury lamp, a low pressure mercury lamp, a Deep-UV lamp, a carbon arc lamp, a chemical lamp, a metal halide lamp, a xenon lamp, a light emitting diode (LED) lamp, a KrF excimer laser, an ArF excimer laser, or an $F_2$ excimer laser may be mentioned, an ultrahigh pressure mercury lamp or an LED lamp is particularly preferable. In addition, the number of light sources may be either one or at least two.

Figure 2C:
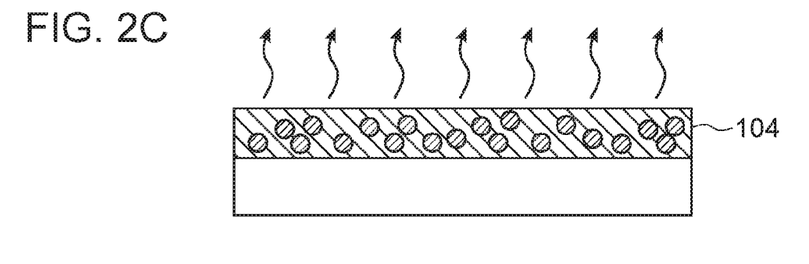

As described above, the ink 10 according to this embodiment contains the low boiling point solvent (C). When the ink 10 is irradiated with light, a component (oily liquid (O)) other than the low boiling point solvent (C) is cured to form a cured material 104 (FIG. 2C).

Figure 2D:
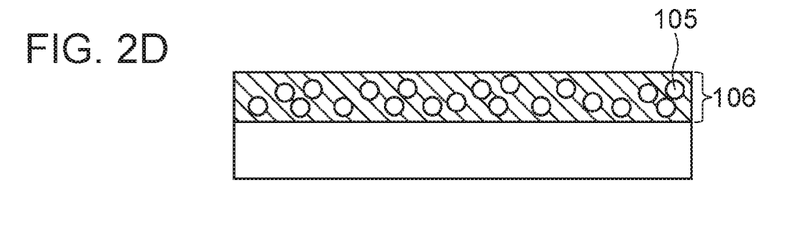

In the case described above, the low boiling point solvent (C) is not cured, and while and/or after the oily liquid (O) is cured, the low boiling point solvent (C) is evaporated. As a result, at portions at each of which the low boiling point solvent (C) is present, voids 105 are formed (FIG. 2D). In addition, when the low boiling point solvent (C) forms liquid droplets in the ink 10, voids 105 having sizes corresponding to the particle diameters of the liquid droplets are formed. Accordingly, a cured film 106 in which a great number of voids 105 is present is formed, and since incident light is scattered by those many voids 105, the cured film 106 shows white color.

In addition, during and/or after the light irradiation step is performed, a drying step by heating using a heater or the like and/or by blowing may also be provided. Accordingly, the evaporation of the low boiling point solvent (C) is promoted, and the cured material can be rapidly dried.

EXAMPLES

Hereinafter, with reference to Examples, Comparative Examples, and Reference Example, the present invention will be described in more detail. However, the present invention is not limited to the following examples.

(Preparation Example 1-1) Preparation of Particle (P-1) Dispersion Liquid

First, 3-methacryloxypropyltrimethoxysilane (3-mpTMS) was added to 2-propanol (isopropyl alcohol, IPA). Subsequently, a mixed liquid of IPA and 0.01 M hydrochloric acid (HCl aq.) was added to the solution thus prepared and was then stirred over approximately one day, so that a solution (surface modification liquid) for surface modification of particles was obtained. The molar ratio of the components of the above solution was set so that 3-mpTMS:IPA:HCl aq.=1:6:6.

A commercially available dispersion liquid (TKD-701, manufactured by TAYCA Corporation) in which titanium oxide particles were dispersed in IPA was added to the solution described above and was then stirred for approximately 3 hours, so that surface modification was performed on the titanium oxide particles. After the surface-modified titanium oxide particles were precipitated by a centrifugal machine, washing was performed with IPA, so that surface-modified titanium oxide particles (Particles (P-1)) were obtained. It is believed that the particles (P-1) each have a surface on which a methacryloyl group functioning as an unsaturated hydrocarbon group is provided.

The titanium oxide particles (Particles (P-1)) thus obtained were re-dispersed in IPA, so that a dispersion liquid having a concentration of approximately 20 percent by weight was prepared.

(Preparation Example 1-2) Preparation of Particle (P-2) Dispersion Liquid

First, vinyltrimethoxysilane (VTMS) was added to 2-propanol (isopropyl alcohol, IPA). Subsequently, a mixed liquid of IPA and 0.01 M hydrochloric acid (HCl aq.) was added to the solution thus prepared and was then stirred over approximately one day, so that a solution (surface modification liquid) for surface modification of particles was obtained. The molar ratio of the components of the above solution was set so that VTMS:IPA:HCl aq.=1:6:6.

A commercially available dispersion liquid (TKD-701, manufactured by TAYCA Corporation) in which titanium oxide particles were dispersed in IPA was added to the solution described above and was then stirred for approximately 3 hours, so that surface modification was performed on the titanium oxide particles. After the surface-modified titanium oxide particles were precipitated by a centrifugal machine, washing was performed using IPA, so that surface-modified titanium oxide particles (Particles (P-2)) were obtained. It is believed that the particles (P-2) each have a surface on which a vinyl group functioning as an unsaturated hydrocarbon group is provided.

The titanium oxide particles (Particles (P-2)) thus obtained were re-dispersed in IPA, so that a dispersion liquid having a concentration of approximately 20 percent by weight was prepared.

(Preparation Example 1-3) Preparation of Particle (P-3) Dispersion Liquid

First, triethoxyvinylsilane (VTES) was added to 2-propanol (isopropyl alcohol, IPA). Subsequently, a mixed liquid of IPA and 0.01 M hydrochloric acid (HCl aq.) was added to the solution thus prepared and was then stirred over approximately one day, so that a solution (surface modification liquid) for surface modification of particles was obtained. The molar ratio of the components of the above solution was set so that VTES:IPA:HCl aq.=1:6:6.

A commercially available dispersion liquid (TKD-701, manufactured by TAYCA Corporation) in which titanium oxide particles were dispersed in IPA was added to the solution described above and was then stirred for approximately 3 hours, so that surface modification was performed on the titanium oxide particles. After the surface-modified titanium oxide particles were precipitated by a centrifugal machine, washing was performed using IPA, so that surface-modified titanium oxide particles (Particles (P-3)) were obtained. It is believed that the particles (P-3) each have a surface on which a vinyl group functioning as an unsaturated hydrocarbon group is provided.

The titanium oxide particles (Particles (P-3)) thus obtained were re-dispersed in IPA, so that a dispersion liquid having a concentration of approximately 20 percent by weight was prepared.

(Preparation Example 1-4) Preparation of Particle (P-4) Dispersion Liquid

First, 3-(trimethoxysilyl)propyl acrylate (3-apTMS) was added to 2-propanol (isopropyl alcohol, IPA). Subsequently, a mixed liquid of IPA and 0.01 M hydrochloric acid (HCl aq.) was added to the solution thus prepared and was then stirred over approximately one day, so that a solution (surface modification liquid) for surface modification of particles was obtained. The molar ratio of the components of the above solution was set so that 3-apTMS:IPA:HCl aq.=1:6:6.

A commercially available dispersion liquid (TKD-701, manufactured by TAYCA Corporation) in which titanium oxide particles were dispersed in IPA was added to the solution described above and was then stirred for approximately 3 hours, so that surface modification was performed on the titanium oxide particles. After the surface-modified titanium oxide particles were precipitated by a centrifugal machine, washing was performed using IPA, so that surface-modified titanium oxide particles (Particles (P-4)) were obtained. It is believed that the particles (P-4) each have a surface on which an acryloyl group functioning as an unsaturated hydrocarbon group is provided.

The titanium oxide particles (Particles (P-4)) thus obtained were re-dispersed in IPA, so that a dispersion liquid having a concentration of approximately 20 percent by weight was prepared.

(Preparation Example 1-5) Preparation of Particle (P-5) Dispersion Liquid

After titanium oxide particles contained in a commercially available dispersion liquid (TKD-701, manufactured by TAYCA Corporation) in which titanium oxide particles were dispersed in IPA were precipitated by a centrifugal machine, washing was performed using IPA, so that titanium oxide particles (Particles (P-5)) on which no surface medication was performed were obtained.

The titanium oxide particles (Particles (P-5)) thus obtained were re-dispersed in IPA, so that a dispersion liquid having a concentration of approximately 20 percent by weight was prepared.

(Preparation Example 2) Preparation of Photocurable Ink

After the following polymerizable compound (A), photopolymerization initiator (B), and low boiling point solvent (C) were blended together in the blend amounts shown in Table 1, mixing and stirring were performed, so that inks of Examples and Comparative Examples were prepared.

In accordance with the blend amounts shown in Table 1, the polymerizable compound (A), the photopolymerization initiator (B), the low boiling point solvent (C), and one of the dispersion liquids of the titanium oxide particles prepared in Preparation Example 1 were mixed and stirred, so that inks of Examples 1 to 4, Comparative Examples 1 to 3, and Reference Example 1 were obtained. In addition, in Comparative Example 2, instead of the dispersion liquid of the titanium oxide particles, the surface modification liquid which was used when the titanium oxide particles (P-1) were prepared was used. In addition, the units of the numerical values described in Examples and Comparative Examples shown in Table 1 each indicate "percent by mass".

(1) Polymerizable Compound (A)

<A-1> Viscoat #230 (1,6-hexanediol diacrylate, manufactured by Osaka Organic Chemical Industry Ltd.)

(2) Photopolymerization Initiator (B)

<B-1> LucirinTPO (2,4,6-trimethylbenzoyl-diphenyl phosphine oxide, manufactured by BASF).

(3) Low Boiling Point Solvent (C)

<C-1> IPA (2-propanol, manufactured by Kishida Chemical Co., Ltd.)

<C-2> Ion exchanged water

TABLE 1

| | | | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | REFERENCE EXAMPLE 1 |
|---|---|---|---|---|---|---|---|---|---|---|
| INK | POLYMERIZABLE COMPOUND (A) | <A-1> | 52.0 | 52.0 | 52.0 | 52.0 | 52.0 | 52.0 | 52.0 | 97.0 |
| | PHOTOPOLYMERIZATION INITIATOR (B) | <B-1> | 3.0 | 3.0 | 3.0 | 3.0 | 3.0 | 3.0 | 3.0 | 3.0 |
| | LOW BOILING POINT SOLVENT (C) | <C-1> | — | — | — | — | — | — | 25.0 | — |
| | | <C-2> | 20.0 | 20.0 | 20.0 | 20.0 | 20.0 | 20.0 | 20.0 | — |
| | PARTICLES (P) | <P-1> DISPERSION LIQUID | 25.0 | — | — | — | — | — | — | — |
| | | <P-2> DISPERSION LIQUID | — | 25.0 | — | — | — | — | — | — |
| | | <P-3> DISPERSION LIQUID | — | — | 25.0 | — | — | — | — | — |
| | | <P-4> DISPERSION LIQUID | — | — | — | 25.0 | — | — | — | — |

TABLE 1-continued

|  |  |  | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | REFERENCE EXAMPLE 1 |
|---|---|---|---|---|---|---|---|---|---|---|
|  |  | <P-5> DISPERSION LIQUID | — | — | — | — | 25.0 | — | — | — |
|  | SURFACE MODIFICATION LIQUID |  | — | — | — | — | — | 25.0 | — | — |
|  | TOTAL |  | 100.0 | 100.0 | 100.0 | 100.0 | 100.0 | 100.0 | 100.0 | 100.0 |
| EVALUATION | L* |  | 65 | 66 | 65 | 63 | 63 | 47 | 45 | — |
|  | ADHESION |  | ○ | ○ | ○ | ○ | x | x | x | ○ |

(Evaluation Method)

The inks of Examples, Comparative Examples, and Reference Example were each dripped in an amount of 17 μL on a glass slide (S111, manufactured by Matsunami Glass Ind., Ltd.) using a micropipette. Furthermore, a PET film (Tetoron HL92W, manufactured by Teijin-Du Pont Film Inc.) having a thickness of 100 μm was placed over the ink described above, so that a region of 26 mm by 26 mm was filled with the ink.

Next, light emitted from an UV light source including an ultrahigh pressure mercury lamp was allowed to pass through a diffusion plate and was then irradiated for 20 seconds through the PET film. Accordingly, the ink provided between the PET film and the glass slide was cured. In addition, the light thus irradiated was UV light having a wavelength 365 nm and an illuminance of 15 mW/cm².

After the light irradiation, the PET film was peeled away from the glass slide. Subsequently, since the PET film was left at room temperature, the low boiling point solvent (C) contained in a cured film formed on the PET film was evaporated, so that a film having a thickness of approximately 25 μm was formed on the PET film.

The degree of whiteness of the film formed on the PET film was evaluated by visual inspection and using brightness L*. For the measurement of the brightness L*, a spectrophotometer (CM-2600d, manufactured by Konica Minolta, Inc.) was used, and the brightness (SCI including specular reflection light) was measured.

In the evaluation of the adhesion of the film formed on the PET film thereto, peeling of a film formed to have a size of 26 mm by 26 mm was evaluated by visual inspection. When the peeling of the film in the above region was 30% or less, the adhesion was evaluated as ○, and the peeling of the film in the above region was more than 70%, the adhesion was evaluated as x.

(Summary of Results)

In each of Examples and Comparative Examples, the film formed on the PET film was a white film by visual inspection. The films formed in Examples 1 to 4 and Comparative Example 1 were each sufficiently white by visual inspection, and the brightness L* also had a value of 60 or more. In addition, since the film formed in Reference Example 1 was transparent by visual inspection, the brightness L* was not measured.

On the other hand, in the evaluation of the adhesion to the PET film functioning as the substrate, although preferable adhesion was obtained in Examples 1 to 4 and Reference Example 1, in Comparative Examples 1 to 3, the adhesion was inferior. That is, when the titanium oxide particles (Particles P-1 to P-3) which were surface-modified with the functional group including an unsaturated hydrocarbon group were added, it was found as the result that the adhesion was improved (Examples 1 to 4). In addition, when the titanium oxide particles which were not surface-modified with the functional group including an unsaturated hydrocarbon group were only added, it was found as the result that the adhesion was not improved (Comparative Example 1). Furthermore, when the surface modification liquid for surface modification by the functional group including an unsaturated hydrocarbon group was only added, it was found as the result that an effect of improving the adhesion was not obtained (Comparative Example 2).

In each of the inks of Examples 1 to 4, it is believed that an emulsion is formed so that liquid droplets formed by a liquid including water (ion exchanged water (C-2)) functioning as the low boiling point solvent (C)) are dispersed in the polymerizable compound (A) and the photopolymerization initiator (B). In those inks described above, it is estimated that the particles (P) are adsorbed on the liquid droplets described above, and hence, the emulsion is stabilized. In addition, in those inks described above, it is believed that IPA contained in the ink is compatible not only with the liquid droplets formed by the liquid including water but also with any phases in the ink other than the phase of the liquid droplets.

From the results described above, it was found that when the titanium oxide particles which were surface-modified with the functional group including an unsaturated hydrocarbon group was added to the photocurable ink, the adhesion between a cured material (cured film) obtained by curing the composition thereof and the substrate (PET film) can be improved.

The present invention is not limited to the embodiments described above and may be variously changed and modified without departing from the spirit and the scope of the present invention. Hence, in order to open the scope of the present invention to the public, the following claims are disclosed.

Accordingly, the present invention provides a photocurable ink which forms a porous cured material on a substrate and which is excellent in adhesion between the cured material and the substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A photocurable ink which contains a polymerizable compound and a photopolymerization initiator, the photocurable ink containing:
   a low boiling point solvent having a boiling point of 40° C. to 120° C. at one atmospheric pressure, and
   at least one particle having a surface on which an unsaturated hydrocarbon group is provided,
   wherein liquid droplets formed by a liquid including the low boiling point solvent are dispersed in the photocurable ink, and
   wherein the photocurable ink contains at least two particles, and the particles are adsorbed on the liquid droplets.

2. The photocurable ink according to claim 1, wherein the low boiling point solvent is water.

3. The photocurable ink according to claim 1, wherein the particles are particles having an average particle diameter of 5 to 100 nm.

4. The photocurable ink according to claim 1, wherein the particle is an inorganic particle.

5. The photocurable ink according to claim 4, wherein the particle includes at least one selected from the group consisting of a titanium oxide particle, a silicon dioxide particle, a zirconium oxide particle, an aluminum oxide particle, a zinc oxide particle, and a barium titanate particle.

6. The photocurable ink according to claim 1, wherein when the total mass of the photocurable ink is set to 100 percent by mass, the content of the particle is 1 to 20 percent by mass.

7. The photocurable ink according to claim 1, wherein when the total mass of the photocurable ink is set to 100 percent by mass, the content of the low boiling point solvent is 10 to 50 percent by mass.

8. The photocurable ink according to claim 1, wherein the unsaturated hydrocarbon group is at least one selected from the group consisting of a vinyl group, an acryloyl group, a methacryloyl group, and a styryl group.

9. The photocurable ink according to claim 1, wherein the unsaturated hydrocarbon group is an acryloyl group or a methacryloyl group.

10. The photocurable ink according to claim 1, wherein the polymerizable compound has a polymerizable functional group.

11. The photocurable ink according to claim 1, wherein the polymerizable compound has an acryloyl group or a methacryloyl group.

12. A photocurable ink according to claim 1, wherein the polymerizable compound is a (meth)acryl compound, and the low boiling point solvent is water.

13. An ink container in which the photocurable ink according to claim 1 is contained.

14. An image forming method comprising:
    a step of disposing the photocurable ink according to claim 1 on a substrate; and
    a step of irradiating the photocurable ink disposed on the substrate with light.

15. The image forming method according to claim 14, wherein the substrate includes a polymer material.

16. The image forming method according to claim 14, wherein the step of disposing the photocurable ink on a substrate is a step of disposing the photocurable ink on the substrate by ejection thereof from an ink jet-type recording head.

* * * * *